US007554905B2

(12) United States Patent
Benvenuti et al.

(10) Patent No.: US 7,554,905 B2
(45) Date of Patent: Jun. 30, 2009

(54) METHOD AND APPARATUS FOR ROUTING A VIRTUAL CONCATENATION GROUP IN A NETWORK

(75) Inventors: Nicolas Benvenuti, Kanata (CA); David Steele, Kanata (CA); Dino Fatica, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 729 days.

(21) Appl. No.: 10/843,330

(22) Filed: May 12, 2004

(65) Prior Publication Data
US 2005/0254522 A1    Nov. 17, 2005

(51) Int. Cl.
*H04L 12/26* (2006.01)
*H04L 12/28* (2006.01)
*H04J 3/04* (2006.01)
(52) U.S. Cl. .................. 370/225; 370/351; 370/535
(58) Field of Classification Search ................ 370/216, 370/218, 389, 392, 401, 503, 509, 535, 225, 370/351; 398/43, 45, 48, 49, 50, 55, 56, 398/58
See application file for complete search history.

(56) References Cited
U.S. PATENT DOCUMENTS
6,956,874 B1 * 10/2005 Moore et al. ................ 370/535

| | | | | |
|---|---|---|---|---|
| 2003/0063613 A1 * | 4/2003 | Carpini et al. | ............. | 370/401 |
| 2003/0212829 A1 * | 11/2003 | Schofield et al. | ............ | 709/250 |
| 2004/0008988 A1 * | 1/2004 | Gerstal et al. | ................ | 398/45 |
| 2004/0076176 A1 * | 4/2004 | Kfir | ......................... | 370/465 |
| 2004/0196838 A1 * | 10/2004 | Zadikian et al. | ............ | 370/360 |
| 2005/0147081 A1 * | 7/2005 | Acharya et al. | ............ | 370/351 |

OTHER PUBLICATIONS

Light Reading—Networking the Telecom Industry, p. 1 of 3 http://lightreading.com/document.asp?doc_id=30194&page_number=5, Apr. 28, 2004.
CommsDesign—Ethernet-over-Sonet Tutorial: Part 1, p. 1 of 8 http://www.comsdesign.com/design_corner/showArticle.jhtml?articleID=16504701, Apr. 28, 2004.

* cited by examiner

*Primary Examiner*—Kevin C Harper
*Assistant Examiner*—Wanda Z Russell
(74) *Attorney, Agent, or Firm*—Jeffrey M. Measures; Borden Ladner Gervais LLP

(57) ABSTRACT

A network control entity that has an input for receiving data indicative of an event associated with a first member of a virtual concatenation group transported through the network. The network control entity also has a processing entity for computing a new route for a second member of the virtual concatenation group, the computing being triggered by the event.

27 Claims, 2 Drawing Sheets

METHOD AND APPARATUS FOR ROUTING A VIRTUAL CONCATENATION GROUP IN A NETWORK

FIELD OF THE INVENTION

The invention relates to methods and network components for controlling the routing of individual members of a virtual concatenation group in a network.

BACKGROUND OF THE INVENTION

In some cases the bandwidth available on a network facility cannot accommodate the bandwidth required to carry a service. In such cases virtual concatenation (VCAT) is used to transport a larger service by splitting the payload into several members that may travel toward a destination node over different routes in the network.

When the members of a given virtual concatenation group travel over different routes, the inherent transmission latency will introduce a differential delay between the members at the destination point. The differential delay is due primarily to the difference in distance in each route. For example, an optical route typically introduces a 5 ms latency per 1000 km. To accommodate a differential delay compensation is required at the destination node that will re-combine the members of the virtual concatenation group. The current approach is to buffer the members and then align them for proper re-combination. Although currently existing systems accommodate a theoretical 256 ms inter-member differential delay, the practical limit is likely less due to the large amount of memory required. If the differential delay exceeds the buffering capability of the destination node, the signal is impacted.

When a service is virtually concatenation and its members are routed over different facilities in the network, it is likely that those facilities are protected. In the event of a protection switch a member may be re-routed over a new route that may affect the distance the signal travels to the destination node and this has a direct impact on the latency of the signal transmission. If the re-routing brings the inter-member differential delay at the destination point beyond what the buffering hardware can handle, the signal is lost.

Against this background, it clearly appears that a need exists in the industry to provide improved mechanisms in a network transporting Virtual concatenation groups to control the latency of the individual members of the group.

SUMMARY OF THE INVENTION

In a first broad aspect, the invention provides a network control entity that has an input for receiving data indicative of an event associated with a first member of a virtual concatenation group transported through the network. The network control entity also has a processing entity for computing a new route for a second member of the virtual concatenation group, the computing being triggered by the event.

In contrast to prior approaches, the network control entity has the ability to control the latency of one member of the virtual concatenation group when an event occurs in connection with a different member of the virtual concatenation group. In a specific and non-limiting example of implementation, the latency control is used to maintain the inter-member differential delay within an acceptable range at a destination node in the network that re-combines the members of the virtual concatenation group.

In a specific and non-limiting example of implementation, the event associated with one of the members of the virtual concatenation group, is a protection switching event that has the effect of re-routing the affected member. The route change is likely to introduce a change in the inter-member differential delay at the destination point. The network entity will then compute new routes for one or more of the remaining members of the group to change their latency accordingly, such as to keep the inter-member differential delay within the buffering capability of the destination node.

In a second broad aspect the invention provides a method for controlling a network, comprising receiving data indicative of an event associated with a first member of a virtual concatenation group traveling through the network and re-routing a second member of the virtual concatenation group over a new route, the re-routing being triggered by the event.

In a third broad aspect the invention provides a network control entity for controlling routing of one or more members of a virtual concatenation group established in the network. The network control entity has an input for receiving control data from a node in the network that re-combines the members of the virtual concatenation group. The network control entity also has a processing entity for deriving routing constraints at least in part on the basis of the control data and computing a new route for re-routing at least one member of the virtual concatenation group at least in part on a basis of the routing constraints.

In a fourth broad aspect the invention provides a method for controlling routing of one or more members of a virtual concatenation group established in the network. The method includes receiving control data from a node in the network that re-combines the members of the virtual concatenation group and deriving routing constraints at least in part on the basis of the control data. The method also includes re-routing at least one member of the virtual concatenation group over a new route computed at least in part on a basis of the routing constraints.

In a fifth broad aspect the invention provides a network node for re-combining members of a virtual concatenation group. At least one member of the virtual concatenation group has several instances thereof traveling in the network toward the network node over different routes. The network node has an input for receiving the members of the virtual concatenation group including the several instances of the at least one member. The network node also has a processing entity for selecting an instance of the several instances of the at least one member of the virtual concatenation group to combine with one or more other members of the virtual concatenation group at least in part on a basis of respective latencies of the instances of the at least one member.

In a sixth broad aspect the invention provides a method for re-combining members of a virtual concatenation group, at least one member of the virtual concatenation group has several instances thereof traveling in the network toward a network node over different routes. The method includes receiving at the node the members of the virtual concatenation group including the several instances of the at least one member. The method further includes selecting an instance of the several instances of the at least one member to combine with one or more other members of the virtual concatenation group at least in part on a basis of respective latencies of the instances of the at least one member. The method further includes releasing from the node the selected instance of the at least one member combined with other members of the virtual concatenation group.

BRIEF DESCRIPTION OF THE DRAWINGS

A detailed description of examples of implementation of the present invention is provided hereinbelow with reference to the following drawings, in which.

Figure 1:
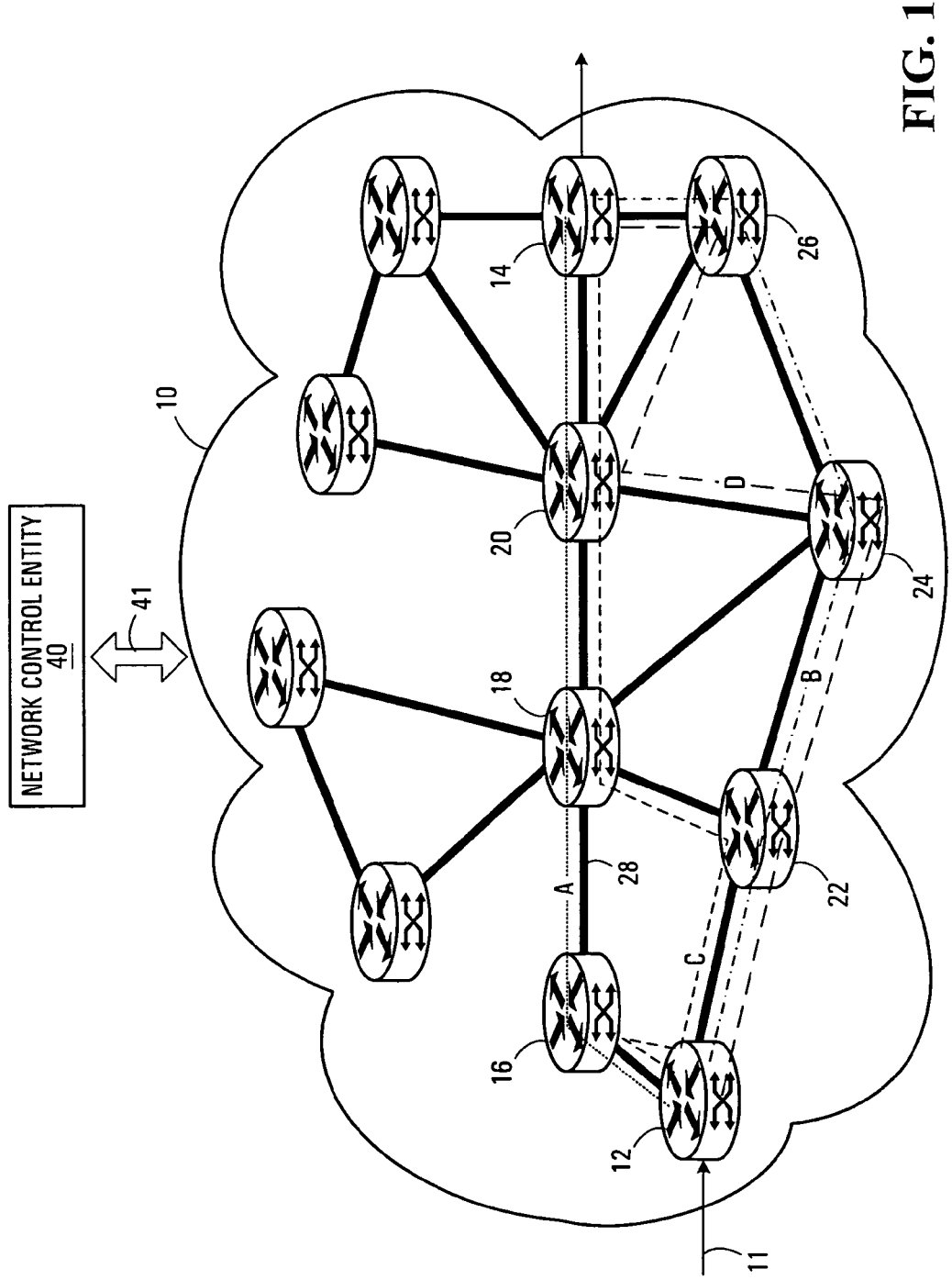
FIG. 1 is a high-level diagram of a network in which the present invention can be implemented.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 is a high level diagram of a network designed to transport packetized data, in which the present invention can be implemented. It should be expressly noted that the following description is only an example and other types of networks can also be used without departing from the spirit of the invention.

The data network 10 includes a plurality of nodes that are connected to one another by data transport connections. The data transport connections can be wireline based or of wireless nature. Examples of wireline-based data transport connections include optical fibers and electrical conductors.

A network control entity 40 receives requests to set-up routes in the network and in response to those requests the necessary control signals are sent to the appropriate nodes of the network 10 such that the data can be delivered between the source and the desired destination. FIG. 1 provides an abstracted view of the network control entity 40, which is shown as being distinct from the network 10. In terms of implementation, the network control entity 40 can be a centralized entity that which exchanges control signals with the various nodes. The double-headed arrow 41 illustrates the control signal exchange. The centralized entity can reside in any one of the nodes of the network 10 and it communicates with other nodes over the data transport connections using any suitable protocol to exchange control information.

Alternatively, the network control entity 40 can be of distributed nature and implemented over several ones of the nodes of the data network 10.

The network 10 is configured to transport virtual concatenation groups. Assume that a service 11 needs to be transported through the network 10, however the bandwidth required is too large to carry all the data over a single route. The service is delivered to source node 12 that will split the data into several individual members which are then routed to the destination node 14 over different routes. Depending on the type of implementation, the network control entity 40 may or may not be involved in the actual route computation for each individual member of the group.

When the individual members of the virtual concatenation group arrive at the node 14, the node will re-assemble them and release them in the form prior to separation by the source node 12. A description of the actual protocols for separating the service into individual members and later re-assembling the members back together is beyond the scope of this specification. For more information on the notion of virtual concatenation, the reader is invited to refer to the following technical standards: G.707, G.783, G790, G798, European Telecommunications Standards Institute (ETSI) EN 300 417-9-1 and the American National Standards Institute (ANSI) T1.105. It should be expressly noted that the invention does not necessarily require compliance with those standards, which are given here only as an example. The invention refers to virtual concatenation groups in a broad sense and may cover applications under the standards listed above or under any other standard.

In a specific and non-limiting example, the network control entity 40 is based on the Automatic Switched Optical Network (ASON) architecture. Alternatively the network control entity can be based on the Automatic Switched Transport Network (ASTN) and optical/electrical/photonic cross connects architecture, among others.

Continuing with the previous example, the node 12 splits the incoming data stream forming the service 11 into two members. It should be expressly noted that the service can be split in more than two members without departing from the spirit of the invention. The first member travels through the network 10 via route A and the second member travels through the network 10 via route B. Route A includes source node 12, nodes 16, 18, 20 and the destination node 14. Route B includes source node 12, nodes 22, 24, 26 and the destination node 14. Assume now that an event occurs in connection with the route A that requires the network 10 to re-route the first member such that it is no longer transported over route A but over another route.

One example of such event is a protection switching event. For instance if the link 28 breaks, the ring of nodes 12, 16, 18 and 22 that is a Bi-directional Line Switched Ring (BLSR), will automatically perform a level 1 protection switching such that the first member of the virtual concatenation group is switched to a different route. Route C is one example of such route. The route C includes source node 12, nodes 16, 12, 22, 18, 20 and destination node 14. Since route C is longer than route A, the latency of the first member is increased and there is a possibility that such increased latency will exceed the buffering capability of the destination node 14. To overcome this potential difficulty, the network control entity 40 will compute a new route for the second member of the virtual concatenation group that travels over route B, although the second member has not been affected by the protection switching event. In computing the new route, the network control entity 40 will try to maintain the inter-member differential delay within a known range at the destination node 14. In the present case this can be accomplished by re-routing the second member over a longer route such as to also increase it latency. Such other route can be route D. Route D includes source node 12, nodes 22, 24, 20, 26 and destination node 14.

A protection switching event is only one example of an event that can trigger the re-routing of a member of the virtual concatenation group that is not directly affected by the event. Another example of such event is a maintenance operation event during which a certain route through the network 10 is no longer available. Yet another example of an event is voluntary re-routing for some specific purpose such as bandwidth management, for example. It should be expressly noted that the invention is not limited to any particular event triggering the re-routing of one or more members of the virtual concatenation group that are not directly affected by the event, as many such events are possible without departing from the spirit of the invention.

Figure 2:
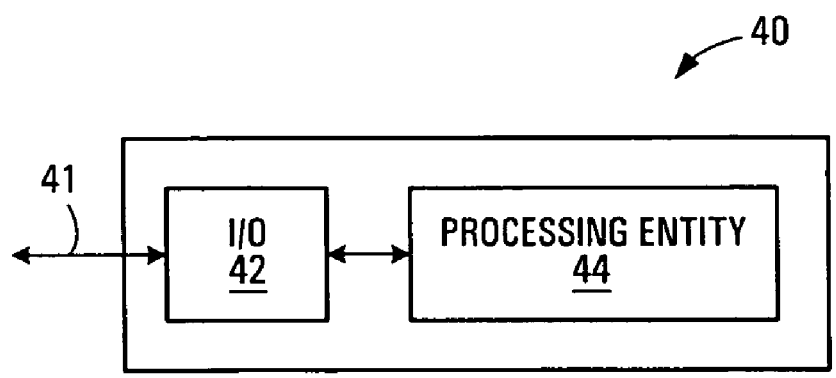
FIG. 2 is a block diagram of a network control entity of the network shown in FIG. 1.

FIG. 2 is a block diagram of the network control entity 40. In the example that is described, the network control entity 40 is implemented as a stand alone centralized entity, however as indicated earlier, it can also be implemented in a distributed fashion over one or more of the nodes. In such distributed form of implementation, the various components shown in FIG. 2 are more likely to be functional elements rather than discrete components.

The network control entity 40 has two main components namely an Input/Output (I/O) 42 and a processing entity 44. The I/O 42 designates globally the interface of the network control entity 40 allowing the network control entity 40 to communicate with individual components of the network 10. The processing entity 42 designates the logic controlling the operation of the network element 12. The operation of the processing entity will be described in greater detail later.

The processing entity 44 is implemented in software that executes on any suitable computing platform. Alternatively, the processing entity 44 can be implemented partly in hardware and partly in software.

In operation, the network control entity 40 receives data via the I/O 42 indicative of the event that is associated with the first member of the virtual concatenation group. The origin of the control data may vary greatly and will largely depend on the event itself. In the case of a protection switching event, the protection switching logic in the network 10 will send the data to the network control entity 40. In the case of a maintenance operation, the data may be originated internally of the network control entity 40, as a result of a command by the network operator entered at the network control entity 40 to make one or more routes in the network 10 unavailable. In the case of a bandwidth management event, the data can also be originated internally, as a result of a command entered by the network operator to re-route a member of the virtual concatenation group for bandwidth management purposes. Yet another example of a source of the data is the destination node 14 that can originate the data in the form of an alarm to the effect that the latency of one of the members has increased to the point of exceeding the local buffering capacity.

While the data received by the network control entity 40 is a trigger for re-routing one or more unaffected members of the virtual concatenation group, it can also convey other information that can be used by the network control entity 40 in computing new routes.

The process of computing a new route for the unaffected member which in the above example is the second member, involves the application of routing constraints. Those routing constraints will allow the network control entity 40 to select a new route among a number of possible routes such that the inter-member differential delay at the destination node 14 is maintained in a known permissible range that can be handled by the local buffering capacity.

In order to develop adequate routing constraints the network control entity 40 uses control data that provides information about what latency is acceptable in a new route. Since latency is directly related to distance, the control data can specify the approximate distance that an acceptable new route should have. If the network control entity 40 posses a network topology database that contains information on all the possible routes and their respective distances, the control data communicating the distance information provides the routing constraints by allowing to eliminate among all the possible routes that are available to reach the destination node 14, the ones that are either too long or too short. The information about what latency is acceptable can include latency values or simply weather the current route induces a latency that is too long or too short, among many other possibilities.

Another possible example of control data is the acceptable inter-member differential delay at the node 14. Since the network control entity 40 has knowledge of the route over which the first member of the virtual concatenation group has been switched, it can derive the distance over which that route extends by reading the network topology database, again assuming this database maps the individual routes with the corresponding distance information. An acceptable new route for the second member of the virtual concatenation group can then be selected among a set of possible routes by comparing the distance of each route in the set with the route of the first member, and eliminating the routes that are either too long or too short by an extent that will create an unacceptable inter-member differential delay at the destination node 14.

Yet another example of control data is permissible route information such as the nodes or transmission links through which the new route can pass.

Once a new route is computed, the processing entity 44 will send via the I/O 42 information on the new route such that it can be implemented. For instance, the information may be in the form of commands to the individual nodes along the new route so that the nodes can perform the necessary switching for the implementation of the new route. In the event the network control entity is not directly responsible for issuing the commands to the individual nodes, the information sent through the I/O 42 may simply define the route in any suitable manner and be directed to the entity in the network 10 suitable to perform the route implementation.

One practical manner to determine the distance over which different routes in the network 10 extend is to perform measurements at the destination node 14 during the normal operation of the network 10 and then create a database that will map the various routes with their respective distances. When the database if fully built it can be uploaded to the network control entity 40.

By determining the actual distance of a given route, say between the source node 12 and the destination node 14, distances over other possible routes between these two nodes can be established by comparing the propagation delay of signals over the respective routes. In the case of an optical route, the propagation delay is in the order of 5 ms per 1000 km. The alignment information contained in the individual members of the virtual concatenation group allows the destination node 14 to determine when they were released from the source node 12. By measuring the inter-member differential delay at the destination node 14, it is relatively simple to determine the latency of each route by comparison to the sample route. For example, if the members have been released from the source node 12 at the same time and they are received 10 ms apart, it can inferred that the route over which the first member is traveling is longer by 2000 km than the route over which the other member is traveling. If one of the members is traveling over the sample route that is known to be 1000 km long, the length of the other route is therefore of 3000 km.

Figure 3:
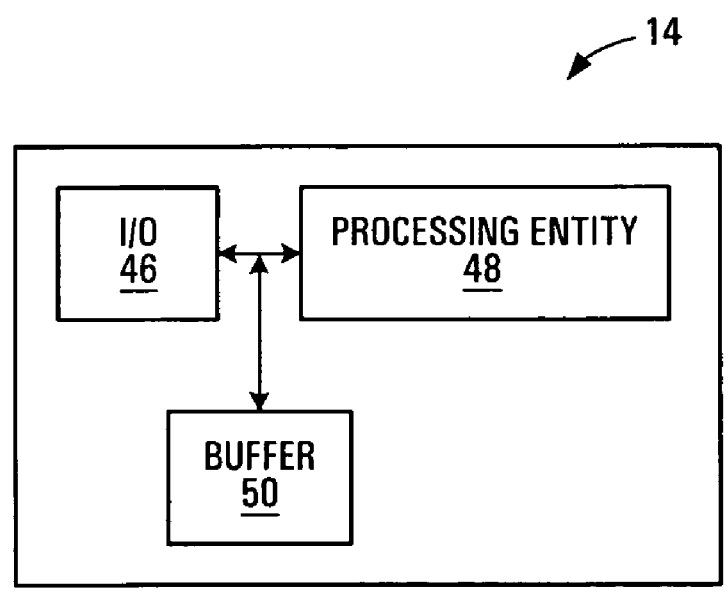
FIG. 3 is a block diagram of a node of the network for re-combining members of a virtual concatenation group.

FIG. 3 is a block diagram of the destination node 14. The destination node 14 has three main components namely an Input/Output (I/O) 46, a processing entity 48 and a buffer 50. The I/O 46 designates globally the interface of the node 14 allowing the node 14 to communicate with individual components of the network 10. Specifically, the various members of the virtual concatenation group are received at the I/O 46. In addition, control data sent or received from the network control entity 40 or from any other node in the network 10 also transits through the I/O 46. Finally, the node 14 also has a buffer 50 that can hold the data belonging to various members of the virtual concatenation group to compensate for the inter-member differential delay and thus allow the members to be properly re-combined. The processing entity 48 implements the logic controlling the operation of the node 14. More particularly, the processing entity 48 implements the logic for re-assembling the various members of the virtual concatenation group. In addition, the processing entity also implements the logic for deriving the distances of the various routes between the node 12 and the node 14, as described earlier.

In a possible variant, the source route 12 is designed such as to split the incoming service 11 into several members, where at least some of the members exist in two or more instances and each instance travels over a different route toward the destination node 14. This means that the destination node 14 receives the data from the members that are instantiated multiple times. Since the different instances travel over different routes they are subjected to different latencies and as such the destination node 14 receives the same data but over a range of differential delays. In such application, if an event associated with a member of the virtual concatenation group occurs, it may no longer be necessary to re-route one or more of the unaffected members. The destination node 14 can switch from one instance to another instance that is now more suitable. The following more detailed example will illustrate this aspect.

Assume that the virtual concatenation group has a first member and a second member and the second member exists in two different instances. The first instance travels over a shorter route than the second instance. As such, the first instance is received by the destination node 14 before the second instance. If an event occurs associated with the first member, say a protection switch which requires the first member to be re-routed over a longer route, the permissible inter-member differential delay at the destination node 14 may be exceeded. To correct the situation, the destination 14 will use the second instance of the second member to re-assemble the members. The selection of which instance to use is done by determining the differential delay between each instance and the one or more other members of the virtual concatenation group, and then choosing the instance that offers the differential delay that is within the permissible range.

The processing entity 44 is implemented in software that executes on any suitable computing platform. Alternatively, the processing entity 44 can be implemented partly in hardware and partly in software.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A network control entity, comprising:
    (a) an I/O for receiving data indicative of an event associated with a first member of a virtual concatenation group transmitted through the network, the event causing a re-routing of the first member to a re-routed first member; and
    (b) a processing entity for computing a new route for a second member of the virtual concatenation group such as to control a differential delay between said re-routed first member and the second member at a destination node in the network that combines the first and the second members, the computing being triggered by the event, said I/O issuing data conveying the new route.

2. A network control entity as defined in claim 1 wherein the event does not affect the second member.

3. A network control entity as defined in claim 2 wherein the event is a protection switching event.

4. A network control entity as defined in claim 3, wherein the protection switching occurs as a result of a fault over a route in the network over which the first member is transported.

5. A network control entity as defined in claim 2 wherein the event is a maintenance operation.

6. A network control entity as defined in claim 5, wherein the maintenance operation makes a route in the network over which the first member is transported unavailable for further transport of the first member.

7. A network control entity as defined in claim 2 wherein the event is a bandwidth management operation.

8. A network control entity as defined in claim 7, wherein the bandwidth management operation requires re-routing of the first member.

9. A network control entity as defined in claim 2 wherein the re-routing of the first member causes a change in the differential delay between the first member and the second member before the second member is re-routed over the new route.

10. A network control entity as defined in claim 2 wherein said processing entity applies routing constraints in computing the new route such as to maintain the differential delay in a known range.

11. A network control entity as defined in claim 10, wherein said network control entity receives control data from the destination node in the network, said processing entity using the control data to develop the routing constraints.

12. A network control entity as defined in claim 1, wherein said network control entity implements a control platform selected in the group consisting of ASTN, ASON and optical/electrical/photonic cross connects.

13. A network control entity as defined in claim 1, wherein the data conveying the new route is issued to one or more network nodes such as to cause re-routing of the second member of the new route.

14. A method for controlling a network, comprising:
    (a) receiving data indicative of an event associated with a first member of a virtual concatenation group transported through the network, the event causing a re-routing of the first member to a re-routed first member;
    (b) re-routing a second member of the virtual concatenation group over a new route, the new route determined in response to the event such as to control a differential delay between said re-routed first member and the second member at a destination node in the network that combines the first and the second members.

15. A method as defined in claim 14, wherein the event is a protection switching event.

16. A method as defined in claim 14, wherein the event is occurrence of maintenance operation.

17. A method as defined in claim 14, wherein the event is occurrence of a bandwidth management operation.

18. A method as defined in claim 14, wherein the re-routing of the first member causes a change in the differential delay between the first member and the second member at the destination node, before the re-routing of the second member over the new route.

19. A method as defined in claim 18, wherein the re-routing implements routing constraints such as to maintain the differential delay between the first member and the second member at the destination node, in a known range.

20. A method as defined in claim 19, wherein said network control entity receives control data from the node in the network, said processing entity deriving the known range from the control data.

21. A network entity for controlling routing of one or more second members of a virtual concatenation group established in the network in response to an event associated with a first member of a virtual concatenation group, the event causing a re-routing of the first member to a re-routed first member, comprising:
- (a) an I/O for receiving control data from a node in the network that re-combines the members of the virtual concatenation group;
- (b) a processing entity for:
  - (i) deriving routing constraints at least in part on the basis of the control data;
  - (ii) computing a new route for re-routing at least one of the second members of the virtual concatenation group such as to control a differential delay between said re-routed first member and the at least one of the second members at a destination node in the network that combines the first and the at least one of the second members at least in part on a basis of the routing constraints.

22. A network entity as defined in claim 21, wherein said processing entity computes the new route at least in part on a basis of the routing constraints to control a differential delay at the node between:
- (a) the at least one of the second members traveling over the new route;
- (b) another member of the virtual concatenation group.

23. A network entity as defined in claim 22, wherein said processing entity computes the new route to maintain the differential delay at the node between:
- (a) the at least one of the second member traveling over the new route;
- (b) another member of the virtual concatenation group, such that the differential delay remains within a known range.

24. A method for controlling routing of one or more second members of a virtual concatenation group established in the network in response to an event associated with a first member of a virtual concatenation group, the event causing a re-routing of the first member to a re-routed first member, comprising:
- (a) receiving control data from a node in the network that re-combines the members of the virtual concatenation group;
- (b) deriving routing constraints at least in part on the basis of the control data;
- (c) re-routing at least one second member of the virtual concatenation group over a new route such as to control a differential delay between said re-routed first member and the at least one second member at a destination node in the network that combines the first and the at least one second member, computed at least in part on a basis of the routing constraints.

25. A method as defined in claim 24, wherein the new route is computed at least in part on a basis of the routing constraints to control a differential delay at the node between:
- (a) the at least one second member traveling over the new route;
- (b) another member of the virtual concatenation group.

26. A network node for re-combining members of a virtual concatenation group in response to an event associated with a first member of a virtual concatenation group, the event causing a re-routing of the first member to a re-routed first member, at least one second member of the virtual concatenation group has several instances thereof traveling in the network toward said network node over different routes, said network node comprising:
- (a) an I/O for receiving the members of the virtual concatenation group including the several instances of the at least one second member;
- (b) a processing entity for selecting an instance of the several instances of the at least one second member to combine with other members of the virtual concatenation group at least in part on a basis of respective latencies of the instances of the at least one second member, the selected instance of the at least one second member combined with other members of the virtual concatenation group being released through said I/O.

27. A method for re-combining members of a virtual concatenation group in response to an event associated with a first member of a virtual concatenation group, the event causing a re-routing of the first member to a re-routed first member, at least one second member of the virtual concatenation group has several instances thereof traveling in the network toward a network node over different routes, said method comprising:
- (a) receiving at the node the members of the virtual concatenation group including the several instances of the at least one second member;
- (b) selecting an instance of the several instances of the at least one second member to combine with other members of the virtual concatenation group at least in part on a basis of respective latencies of the instances of the at least one second member;
- (c) releasing from the node the selected instance of the at least one second member combined with other members of the virtual concatenation group.

* * * * *